United States Patent
Takeuchi et al.

(10) Patent No.: US 12,416,541 B2
(45) Date of Patent: Sep. 16, 2025

(54) ELECTRIC CONNECTION BOX

(71) Applicants: Sumitomo Wiring Systems, Ltd., Yokkaichi (JP); TOYOTA JIDOSHA KABUSHIKI KAISHA, Toyota (JP)

(72) Inventors: Takayuki Takeuchi, Yokkaichi (JP); Yoshiki Yanagita, Nagakute (JP); Shogo Tomihira, Nisshin (JP)

(73) Assignees: SUMITOMO WIRING SYSTEMS, LTD., Mie (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 407 days.

(21) Appl. No.: 18/054,617

(22) Filed: Nov. 11, 2022

(65) Prior Publication Data
US 2023/0147180 A1    May 11, 2023

(30) Foreign Application Priority Data
Nov. 11, 2021    (JP) .................................. 2021-184097

(51) Int. Cl.
*G01F 23/24*    (2006.01)
*B60R 16/023*    (2006.01)
*G01M 3/18*    (2006.01)

(52) U.S. Cl.
CPC .......... *G01M 3/186* (2013.01); *B60R 16/0238* (2013.01)

(58) Field of Classification Search
CPC .......... G01F 23/0007; G01F 23/24–244; G01F 23/26–268
See application file for complete search history.

(56) References Cited

U.S. PATENT DOCUMENTS

| | | | | |
|---|---|---|---|---|
| 4,541,446 A | * | 9/1985 | Hogan | G01F 23/241 73/304 R |
| 2011/0090625 A1 | | 4/2011 | Oota | |
| 2013/0069675 A1 | * | 3/2013 | Woloszyk | G01M 3/16 324/693 |
| 2013/0214802 A1 | * | 8/2013 | Adachi | G01M 3/16 324/693 |
| 2018/0065576 A1 | | 3/2018 | Kawaguchi | |
| 2018/0301722 A1 | * | 10/2018 | Kozuka | H01M 8/04835 |
| 2021/0226432 A1 | | 7/2021 | Ohira et al. | |

FOREIGN PATENT DOCUMENTS

| | | |
|---|---|---|
| JP | H11135955 A | 5/1999 |
| JP | 2011103444 A | 5/2011 |
| JP | 2013170943 A | 9/2013 |
| JP | 2021114852 A | 8/2021 |

OTHER PUBLICATIONS

English translation of JP 2013-170943 (Year: 2013).*

* cited by examiner

*Primary Examiner* — Alexander A Mercado
(74) *Attorney, Agent, or Firm* — Honigman LLP

(57) ABSTRACT

Provided is an electric connection box with which proactive measures can be taken by liquid inflow monitoring. The electric connection box includes a housing where an electronic component is mounted. The housing is provided with a detection part detecting liquid inflow.

5 Claims, 6 Drawing Sheets

ELECTRIC CONNECTION BOX

CROSS-REFERENCE TO RELATED APPLICATION

This Non-provisional application claims priority of Japanese Patent Application No. 2021-184097 filed on Nov. 11, 2021, the entire contents of which are incorporated herein.

TECHNICAL FIELD

The present disclosure relates to an electric connection box.

BACKGROUND

In the related art, a vehicle is equipped with an electric connection box where an electronic component such as a relay is mounted. The vehicle equipped with the electric connection box may be involved in a flood or an accident, and a liquid such as water and seawater may flow into the electric connection box of such a vehicle. Such liquid inflow may result in a short circuit and a malfunction.

Japanese Patent Application Laid-Open Publication No. 2018-042356 discloses an electric connection box in which a partition wall for partitioning between high- and low-voltage circuit regions is configured to be higher than the peripheral wall of a housing having the high- and low-voltage circuit regions.

According to Japanese Patent Laid-Open Publication No. 2018-042356, it is possible to avoid a short circuit occurring in both circuit regions via water even in a case where a liquid flows in and remains in the housing.

Once the liquid flows into the electric connection box, it takes a considerable amount of time to completely drain the liquid. Besides, meanwhile, the risks of short circuit, malfunction, and the like still remain. Accordingly, it is desirable to monitor liquid inflow into the electric connection box and take countermeasures in advance.

However, the electric connection box of Japanese Patent Laid-Open Publication No. 2018-042356 focuses only on post-liquid inflow risks, without devising anything as to liquid inflow monitoring and proactive measures against liquid inflow, and is incapable of solving the above problems.

SUMMARY

The present disclosure has been made in view of such circumstances, and an object of the present disclosure is to provide an electric connection box with which proactive measures can be taken by liquid inflow monitoring.

An electric connection box according to an embodiment of the present disclosure includes a housing where an electronic component is mounted. The housing is provided with a detection part detecting liquid inflow.

According to the present disclosure, proactive measures can be taken by monitoring liquid flow into the electric connection box.

The above and further objects and features will more fully be apparent from the following detailed description with accompanying drawings.

DETAILED DESCRIPTION OF PREFERRED EMBODIMENTS

Figure 1:
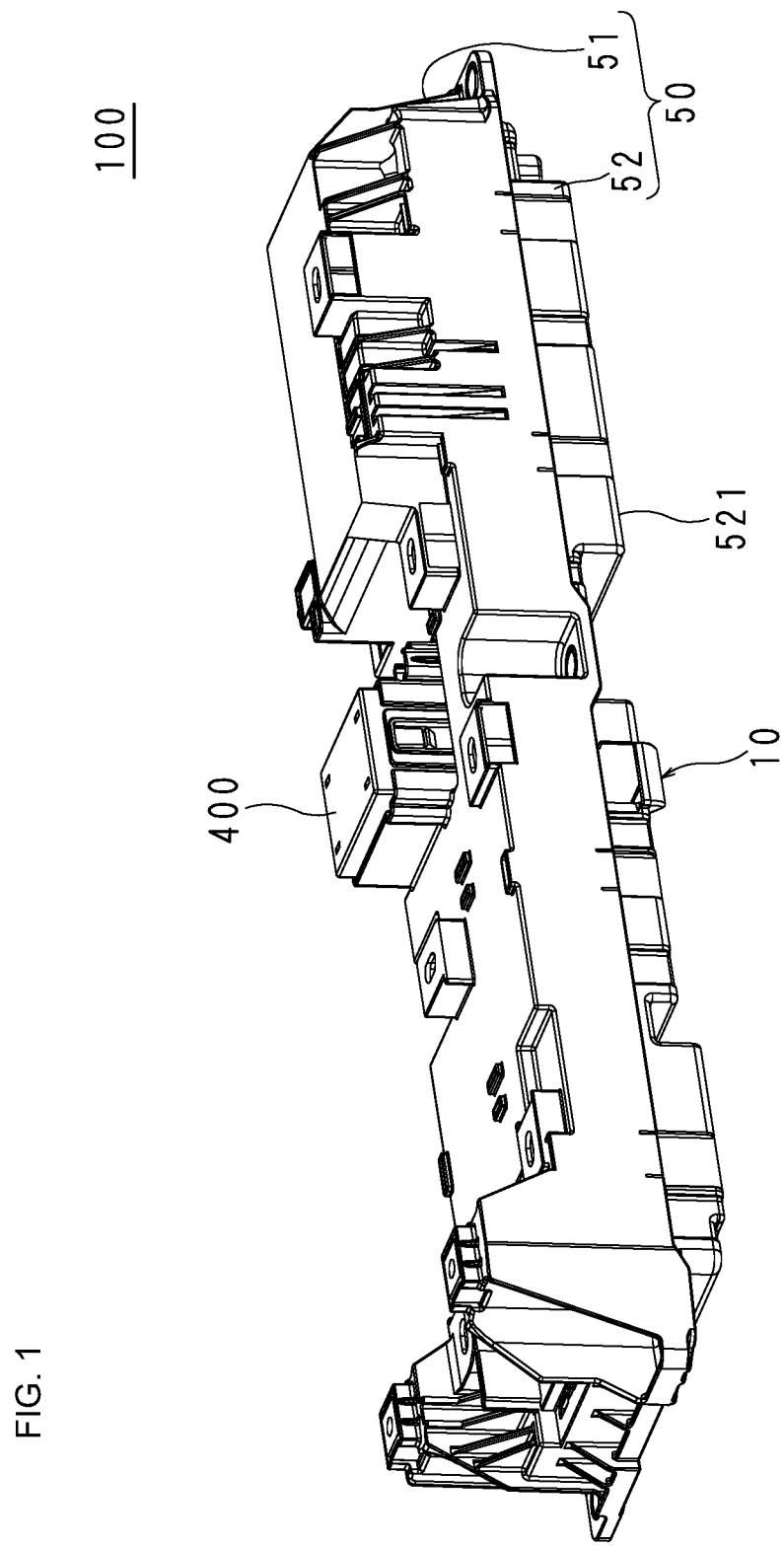
FIG. 1 is a perspective view of an electric connection box according to the present embodiment.

First, an aspect of implementation of the present disclosure will be listed and described. In addition, at least a part of the embodiment described below may be combined in any manner.

First Aspect

An electric connection box according to a first aspect of the present disclosure includes a housing where an electronic component is mounted, in which the housing includes a detection part detecting inflow of a liquid.

In the first aspect, the detection part detecting the liquid inflow is provided, and thus the liquid inflow can be monitored and countermeasures can be taken in advance or early against the flow of the liquid into the housing.

Second Aspect

In the electric connection box according to a second aspect of the present disclosure, the detection part has a storage recess having an inlet for the liquid and storing the liquid flowing in from the inlet and a detection needle disposed in the storage recess.

In the second aspect, at the detection part, the liquid flowing into the storage recess through the inlet is stored in the storage recess and detected by the detection needle. Since the liquid flowing in is stored and detected, even a small amount of liquid can be detected.

Third Aspect

In the electric connection box according to a third aspect of the present disclosure, the storage recess has a curved bottom surface guiding the liquid to an inner side wall facing the inlet, and the detection needle is disposed near the inner side wall.

In the third aspect, the liquid flowing into the storage recess through the inlet is guided by the curved bottom surface to the inner side wall where the detection needle is disposed and stored. Accordingly, even a small amount of liquid can be detected.

Fourth Aspect

In the electric connection box according to a fourth aspect of the present disclosure, a liquid drain hole for the liquid is provided in the inner side wall.

In the fourth aspect, the liquid that is greater than the amount necessary for the detection by the detection needle is discharged out of the housing by the liquid drain hole. Accordingly, it is possible to forestall the liquid being excessively stored in the storage recess and flowing into the housing over the storage recess.

Fifth Aspect

In the electric connection box according to a fifth aspect of the present disclosure, a width on the inner side wall is smaller than a width on the inlet in the storage recess.

In the fifth aspect, since the width on the inner side wall side is smaller than the width on the inlet side in the storage recess, the liquid surface rise in the vicinity of the inner side wall where the detection needle is disposed accelerates. Accordingly, the detection needle is capable of early liquid inflow detection.

Sixth Aspect

In the electric connection box according to a sixth aspect of the present disclosure, the liquid drain hole is provided at a position separated from the curved bottom surface by a distance two to four times as long as a gap between the detection needle and the curved bottom surface.

In the sixth aspect, since the liquid drain hole is provided at the position separated from the curved bottom surface by a distance two to four times as long as the gap between the detection needle and the curved bottom surface, it is possible to discharge out of the housing the liquid greater than the amount necessary for the detection while reliably executing the detection by the detection needle.

Seventh Aspect

The electric connection box according to a seventh aspect of the present disclosure further includes a bus bar connected to the electronic component, in which the detection needle is formed integrally with the bus bar.

In the seventh aspect, since the detection needle is formed integrally with the bus bar, a detection result of the detection needle can be acquired via the bus bar and a circuit configuration for the detection result of the detection needle is facilitated.

An electric connection box according to an embodiment of the present disclosure will be described below with reference to the drawings. It should be noted that the present disclosure is not limited to the exemplifications. The present disclosure is defined by the scope of the claims and is intended to include every modification within the meaning and scope equivalent to the scope of the claims.

Hereinafter, the present embodiment will be described by taking as an example an electronic component-mounted vehicular electric connection box.

FIG. 1 is a perspective view of an electric connection box 100 according to the present embodiment.

The electric connection box 100 is attached to the outside of, for example, an electric vehicle (EV) battery pack. The electric connection box 100 includes a housing 50 where an electronic component such as a fuse and a relay 400 is mounted.

The housing 50 is made of, for example, resin or metal and includes a lower case 52 and an upper case 51 covering the lower case 52. The housing 50 is, for example, attached to the battery pack such that a bottom plate 521 of the lower case 52 faces the battery pack. The bottom plate 521 has an uneven shape in the thickness direction.

The lower case 52 has the shape of a flat housing with one surface open. A plurality of ribs are formed and a plurality of pedestals are formed inside the lower case 52. A bus bar, an electronic component (not illustrated), and so on are attached to the pedestal.

In addition, the lower case 52 is provided with a detection part 10 detecting the flow of a liquid such as rainwater and seawater into the battery pack or the electric connection box 100.

Figure 2:
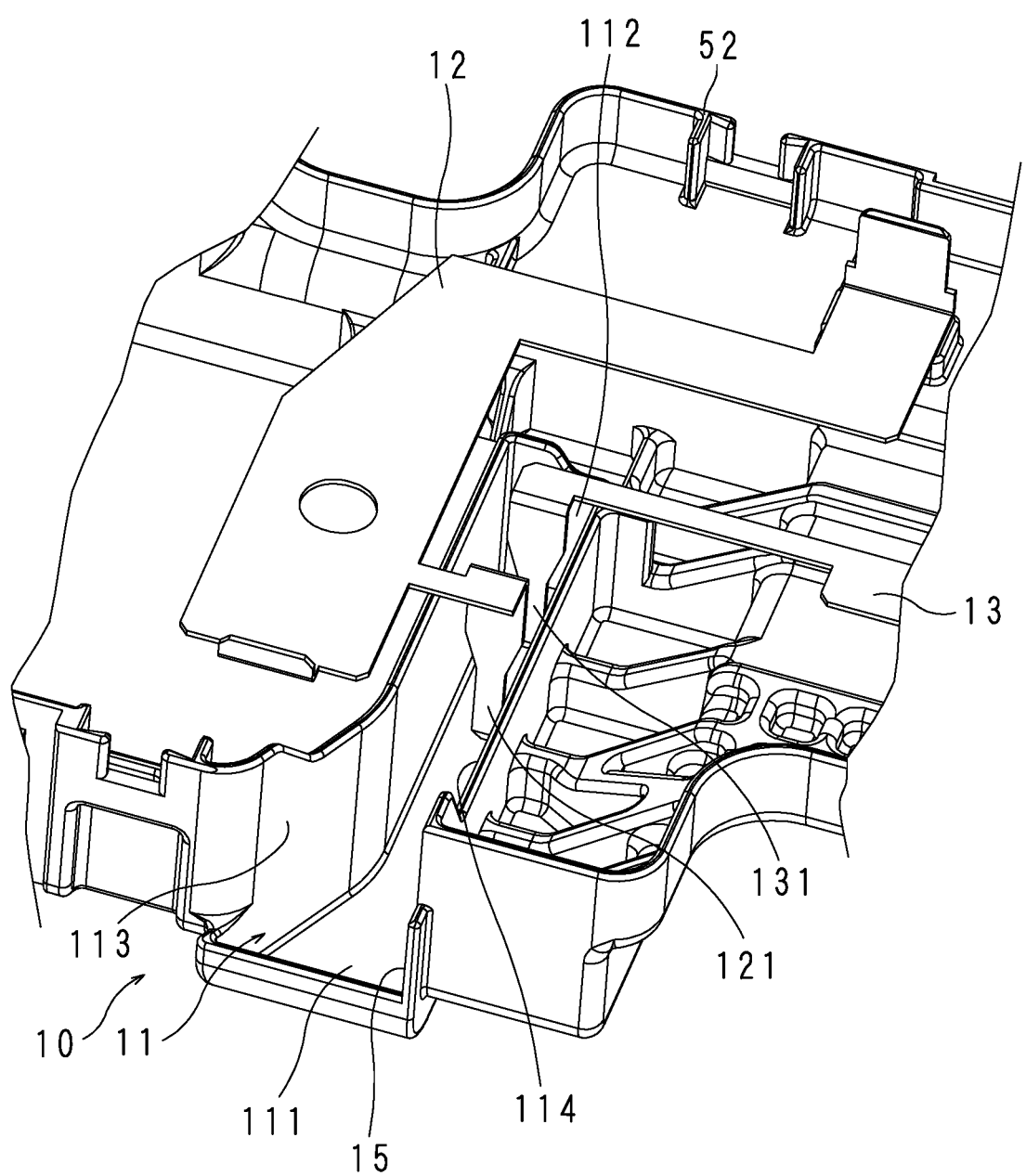
FIG. 2 is a partial perspective view of a lower case of the electric connection box of the present embodiment.
Figure 3:
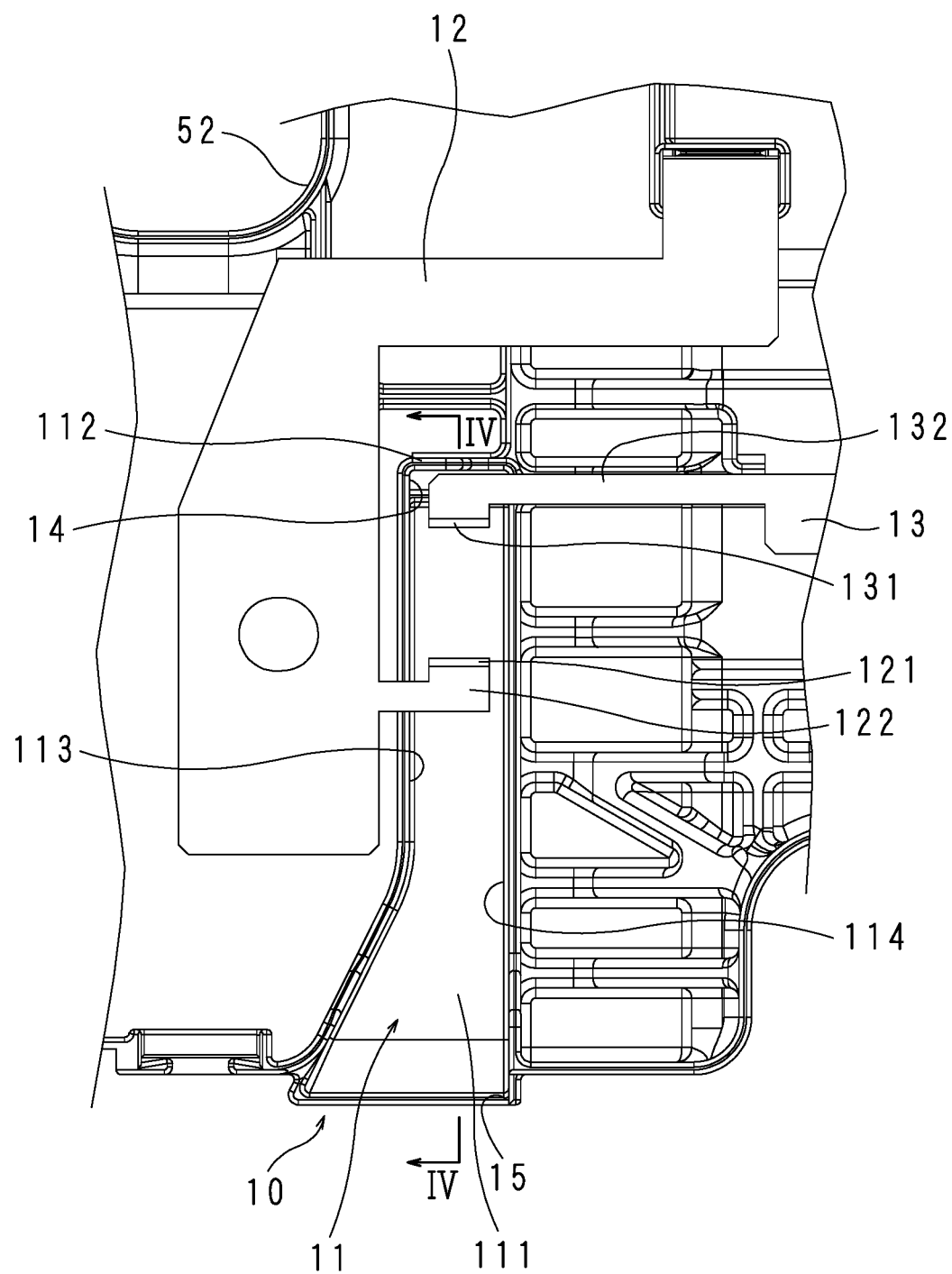
FIG. 3 is a partial plan view of the lower case of the electric connection box of the present embodiment.

FIG. 2 is a partial perspective view of the lower case 52 of the electric connection box 100 of the present embodiment, and FIG. 3 is a partial plan view of the lower case 52 of the electric connection box 100 of the present embodiment. FIGS. 2 and 3 illustrate the detection part 10 and the surroundings of the detection part 10 in the lower case 52 with the upper case 51 removed.

The detection part 10 has a storage recess 11 storing a liquid flowing into the electric connection box 100 from the outside (hereinafter, referred to as inflow liquid) and a pair of detection needles 121 and 131 disposed in the storage recess 11.

The storage recess 11 is provided in the vicinity of one side wall of the lower case 52. The storage recess 11 communicates with the outside of the lower case 52 through an inlet 15 provided in the one side wall. In other words, the storage recess 11 has the inlet 15 communicating with the outside of the lower case 52. Accordingly, before the inflow liquid starts to flow into the electric connection box 100, the inflow liquid first flows into the storage recess 11 through the inlet 15.

The storage recess 11 is substantially trumpet-shaped in a plan view and has three side walls erected inside the bottom plate 521 of the lower case 52. The storage recess 11 has a inner side wall 112 provided on the back side far from the inlet 15 and facing the inlet 15 and a first side wall 113 and a second side wall 114 continuously provided on both sides of the inner side wall 112 and disposed so as to substantially face each other. Each of the inside ends of the first side wall 113 and the second side wall 114 is provided so as to be continuous with the inner side wall 112 as described above. The outside ends of the first side wall 113 and the second side wall 114 configure the edge of the inlet 15.

The second side wall 114 extends straight from the inner side wall 112 toward the one side wall of the lower case 52. On the other hand, the end portion of the first side wall 113 that is close to the one side wall of the lower case 52 is curved to the outside, that is, in the direction away from the second side wall 114. Accordingly, the gap between the first side wall 113 and the second side wall 114 widens toward the inlet 15. In other words, in the storage recess 11, the width on the inner side wall 112 is smaller than the width on the inlet 15. In other words, the dimension of the storage recess 11 in the direction intersecting the facing direction of the inlet 15 and the inner side wall 112 is shorter on the inner side wall 112 than at the inlet 15.

Figure 4:
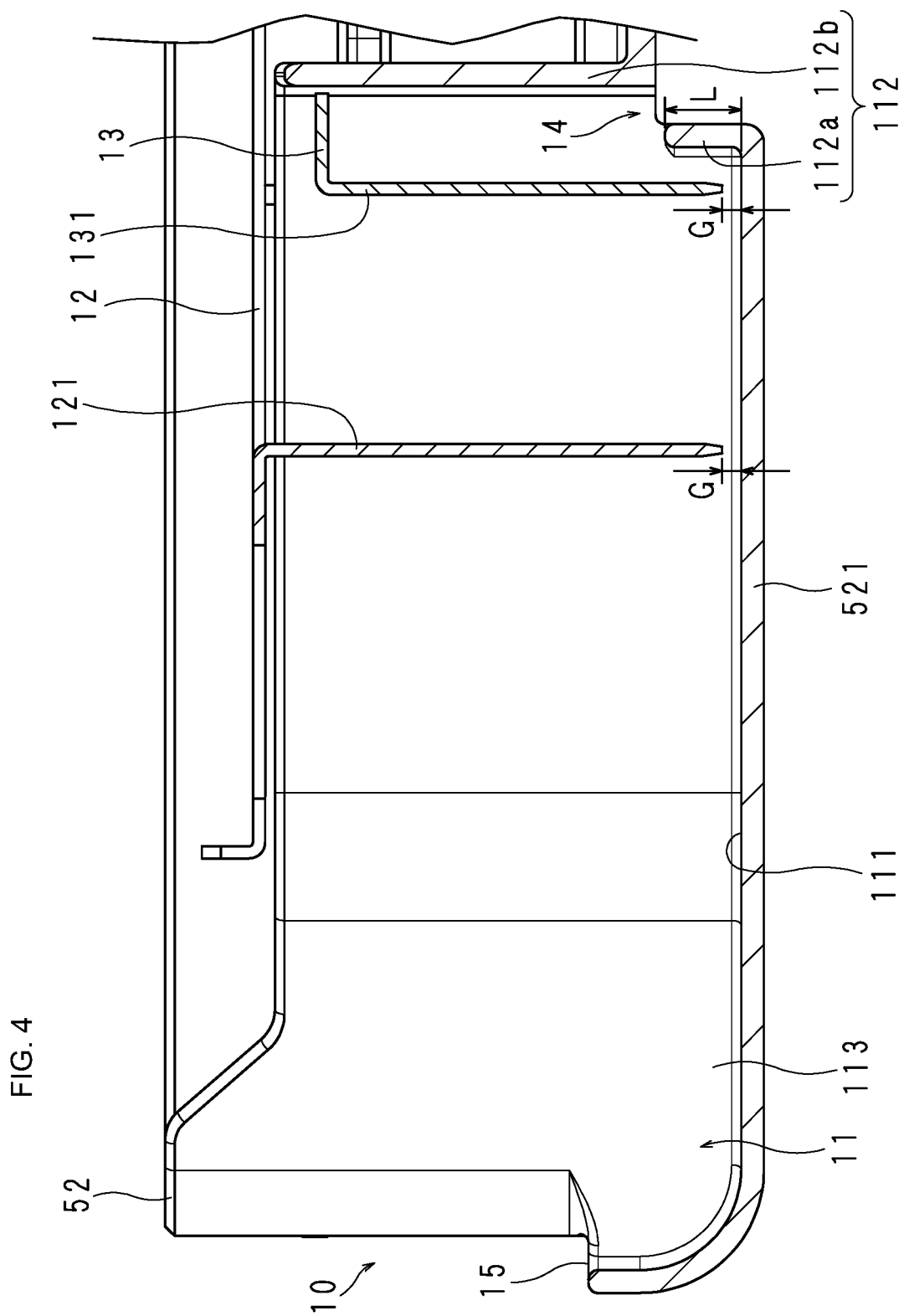
FIG. 4 is a partial cross-sectional view of the lower case taken along line IV-IV of FIG. 3.

A bottom surface 111 (curved bottom surface) of the storage recess 11 is curved and guides the inflow liquid flowing into the storage recess 11 through the inlet 15 to the inner side wall 112. FIG. 4 is a partial cross-sectional view of the lower case 52 taken along line IV-IV of FIG. 3.

As can be seen from FIG. 4, in a cross-sectional view, the bottom surface 111 has a flat end portion near the inner side wall 112 and an upwardly curved end portion near the inlet 15. Accordingly, the flow of the inflow liquid flowing into the storage recess 11 through the inlet 15 can be strengthened and the inflow liquid easily flows to the inner side wall 112.

In addition, the detection part 10 has a liquid drain hole 14 for discharging, to the outside of the electric connection box 100, the inflow liquid that is greater than the amount necessary for the detection needles 121 and 131 to detect the inflow liquid. The liquid drain hole 14 is formed in the inner side wall 112.

Figure 5:
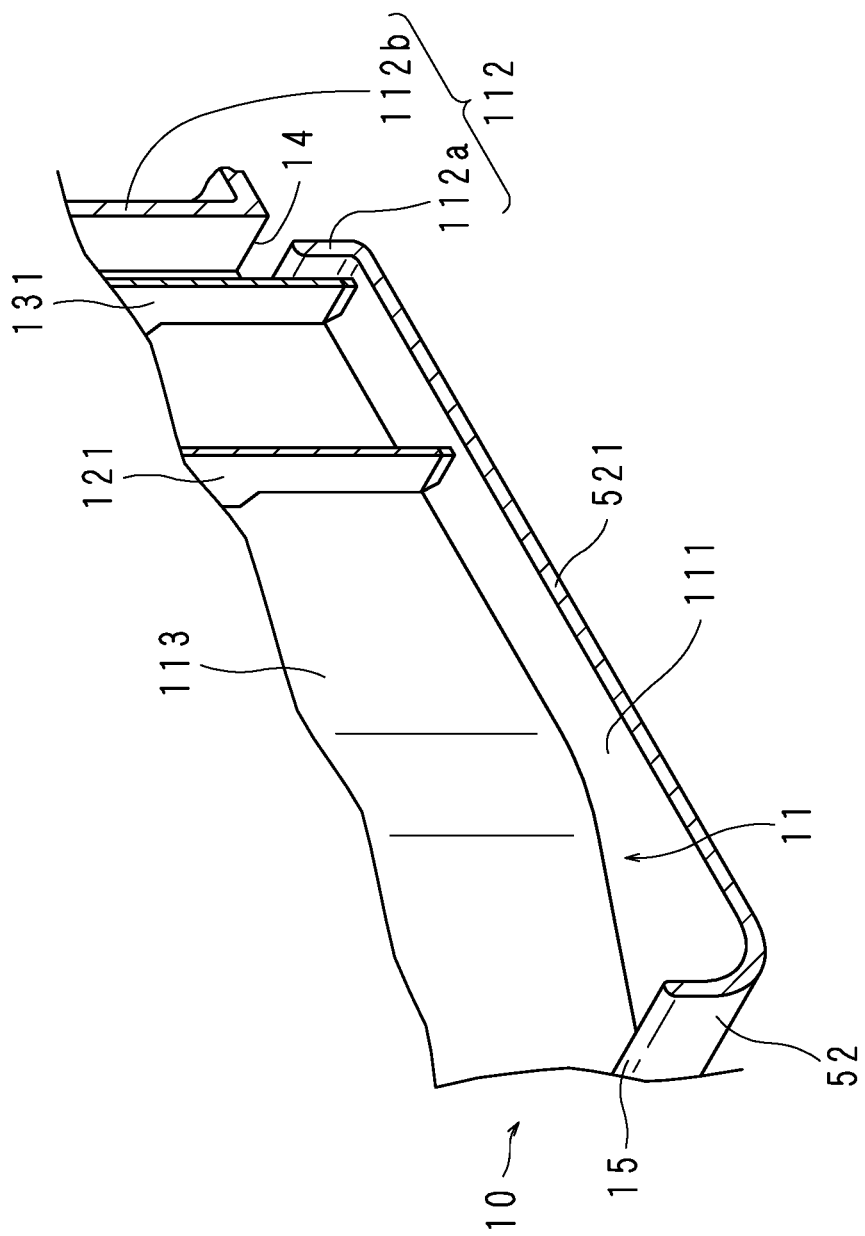
FIG. 5 is a partial cross-sectional view illustrating the internal configuration of a storage recess of a detection part.

FIG. 5 is a partial cross-sectional view illustrating the internal configuration of the storage recess 11 of the detection part 10.

The inner side wall 112 includes a lower inner side wall 112a provided close to the bottom surface 111 and an upper inner side wall 112b positioned farther from the bottom surface 111 than the lower inner side wall 112a. The lower inner side wall 112a is smaller than the upper inner side wall 112b in up-down-direction dimension, and the lower inner side wall 112a is provided so as to be continuous with the bottom surface 111. The upper inner side wall 112b is provided away from the lower inner side wall 112a in the direction away from the inlet 15 and above the upper end of the lower inner side wall 112a.

In this manner, the inner side wall 112 includes the two parts of the lower inner side wall 112a and the upper inner side wall 112b, the upper inner side wall 112b is separated from the lower inner side wall 112a in the facing direction of the inlet 15 and the inner side wall 112, and thus a substantially rectangular gap is formed between the lower inner side wall 112a and the upper inner side wall 112b. Such a gap corresponds to the liquid drain hole 14. As described above, the liquid drain hole 14 communicates with the outside of the electric connection box 100.

In addition, in order to prevent the excessive inflow liquid that is equal to or greater than the amount necessary for the inflow liquid detection from storing in the storage recess 11, in this configuration, the lower inner side wall 112a is smaller than the upper inner side wall 112b in up-down-direction dimension (hereinafter, referred to as up-down dimension) as described above. In FIG. 4, L denotes the up-down dimension of the lower inner side wall 112a.

In other words, the up-down dimension L of the lower inner side wall 112a defines the liquid surface level of the inflow liquid storing in the storage recess 11. In a case where the up-down dimension L of the lower inner side wall 112a is too short, the liquid surface level of the inflow liquid is too low, and thus the inflow liquid detection by the detection needles 121 and 131 is inaccurate. On the other hand, in a case where the up-down dimension L of the lower inner side wall 112a is too long, the liquid surface level of the inflow liquid is too high, and thus the inflow liquid in the storage recess 11 may flow into the lower case 52 by splashing over the first side wall 113 or the second side wall 114.

In view of such a problem, it is desirable that the up-down dimension L of the lower inner side wall 112a is two to four times a gap G between the lower ends of the detection needles 121 and 131 and the bottom surface 111 (see FIG. 4). In other words, the liquid drain hole 14 is provided above the bottom surface 111 by a distance two to four times as long as the gap G between the detection needles 121 and 131 and the bottom surface 111.

The detection needles 121 and 131 are disposed in the vicinity of the inner side wall 112 in the storage recess 11. The detection needles 121 and 131 are disposed with an insulation distance in the facing direction of the inlet 15 and the inner side wall 112. The detection needles 121 and 131 are substantially strip-shaped, extend in the up-down direction, and are parallel to each other (see FIG. 4). The detection needles 121 and 131 have the same shape, and the lower end portions thereof are reduced in width. The lower ends of the detection needles 121 and 131 are provided apart by the gap G from the bottom surface 111 as described above.

Bus bars 12 and 13 connected to the electronic component mounted on the electric connection box 100 are disposed in the vicinity of the storage recess 11 in the lower case 52. The detection needles 121 and 131 are formed integrally with the bus bars 12 and 13, respectively. The detection needle 121 is formed integrally with the bus bar 12, and the detection needle 131 is formed integrally with the bus bar 13 (see FIGS. 2 and 3). The bus bars 12 and 13 are made of, for example, a conductive metal plate material.

Specifically, although the detection needles 121 and 131 are disposed apart from the bus bars 12 and 13, respectively, the upper end of the detection needle 121 is connected to the bus bar 12 by a strip-shaped plate member 122 and the upper end of the detection needle 131 is connected to the bus bar 13 by a strip-shaped plate member 132.

The detection part 10 configured as described above detects the flow of the inflow liquid into the electric connection box 100. For example, when the inflow liquid flows into the electric connection box 100, the inflow liquid flows into the storage recess 11 through the inlet 15 in the side wall of the lower case 52 and stores in the storage recess 11. The detection needles 121 and 131 are immersed in the inflow liquid by the amount of the inflow liquid that is stored in the storage recess 11 increasing and the liquid surface level of the inflow liquid exceeding the gap G between the bottom surface 111 and the detection needles 121 and 131. At this time, the resistance value between the detection needles 121 and 131, that is, the resistance value between the bus bars 12 and 13 decreases, and thus the flow of the inflow liquid into the electric connection box 100 can be detected by monitoring the resistance value between the bus bars 12 and 13.

In other words, in the electric connection box 100, the detection part 10 monitors (detects) the flow of the inflow liquid into the electric connection box 100, and thus countermeasures against inflow of the inflow liquid can be quickly taken based on the monitoring result of the detection part 10.

The inflow liquid detection result of the detection part 10 may be output to the outside (e.g. ECU) and the driver of a vehicle equipped with the electric connection box 100 of the present embodiment may be notified of the result.

Figure 6:
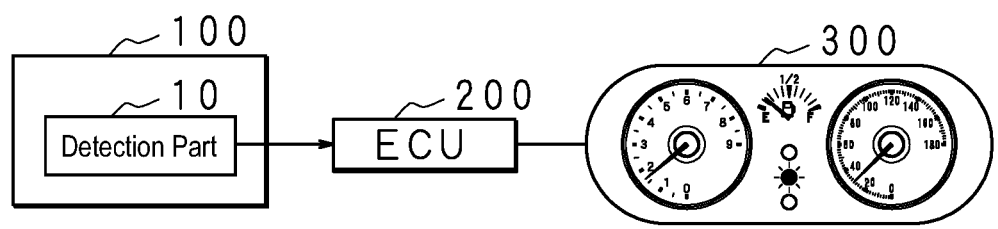
FIG. 6 is an explanatory diagram conceptually describing a circuit configuration for notifying a driver of an inflow liquid detection result of the detection part.

FIG. 6 is an explanatory diagram conceptually illustrating a circuit configuration for notifying a driver of the inflow liquid detection result of the detection part 10.

An ECU 200 is connected to the electric connection box 100 (detection part 10) and an instrument panel 300. For example, the instrument panel 300 is provided with a warning light indicating the flow of the inflow liquid into the electric connection box 100 or the battery pack. The ECU 200 monitors a change in resistance value between the bus bars 12 and 13 (detection needles 121 and 131) based on the detection result output from the detection part 10 and causes the warning light on the instrument panel 300 to flicker in accordance with the monitoring result.

Specifically, the ECU 200 monitors the resistance value between the bus bars 12 and 13 and, in a case where such a resistance value decreases to or below a predetermined threshold, causes the warning light on the instrument panel 300 to flicker to notify the driver of the inflow of the inflow liquid.

In the electric connection box 100 of the present embodiment, the detection part 10 communicates with the outside through the inlet 15 formed in the side wall of the lower case 52 as described above, and thus the inflow liquid easily flows into the storage recess 11 of the detection part 10. Accordingly, the inflow liquid can be detected early immediately before the inflow liquid flows into the electric connection box 100.

In addition, as described above, in the storage recess 11 of the electric connection box 100, the width on the inner side wall 112 is smaller than the width on the inlet 15. Accordingly, in a case where the inflow liquid flows into the storage recess 11, the liquid surface rise in the vicinity of the inner side wall 112, that is, in the vicinity of the detection needles 121 and 131 accelerates and the detection needles 121 and 131 are capable of quickly detecting the inflow liquid even at a small inflow liquid amount.

Further, as described above, the bottom surface 111 of the storage recess 11 is curved and the inflow liquid flowing into the storage recess 11 is guided to the inner side wall 112. Accordingly, the liquid surface rise in the vicinity of the detection needles 121 and 131 further accelerates.

In addition, in the electric connection box 100, the detection part 10 has the liquid drain hole 14, and thus the inflow liquid that is greater than the amount necessary for the inflow liquid detection is discharged out of the electric connection box 100 through the liquid drain hole 14. Accordingly, no excessive inflow liquid storage occurs in the storage recess 11 and it is possible to prevent the inflow liquid in the storage recess 11 from flowing into the lower case 52 over the first side wall 113 or the second side wall 114 when, for example, the electric connection box 100 vibrates.

In addition, in the electric connection box 100, the detection needles 121 and 131 are formed integrally with the bus bars 12 and 13, respectively. Accordingly, a change in resistance value between the detection needles 121 and 131 can be confirmed via a change in resistance value between the bus bars 12 and 13. Accordingly, the circuit configuration for outputting the inflow liquid detection result of the detection part 10 is easy and simple.

The embodiment disclosed this time is an exemplification in every respect and should be considered not restrictive. The scope of the present disclosure is defined not by the meaning described above but by the scope of the claims and is intended to include every modification within the meaning and scope equivalent to the scope of the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An electric connection box comprising:
   a housing where an electronic component is mounted, the housing having a first side wall spaced apart from a second side wall, an inner side wall extending between the first side wall and the second side wall and a bottom surface extending between the first side wall and the second side wall and from the inner side wall to a front opening of the housing so as to define a storage recess having an inlet for receiving liquid, wherein the inner side wall includes a lower inner side wall and an upper inner side wall that are parallel to and offset from each other so as to define a drain hole for draining the liquid, and
   a detection needle disposed in the storage recess to detect an inflow of liquid, wherein the detection needle is disposed closer to the inner side wall relative to the front opening of the storage recess.

2. The electric connection box according to claim 1, wherein the bottom surface is curved so as to guide the liquid to the inner side wall.

3. The electric connection box according to claim 2, wherein a width of the storage region at the inner side wall is smaller than a width of the storage region at the inlet.

4. The electric connection box according to claim 1, wherein the a height of the lower inner side wall is distance two to four times as long as a gap between the detection needle and the bottom surface.

5. The electric connection box according to claim 1, further comprising a bus bar connected to the electronic component, wherein the detection needle is formed integrally with the bus bar.

\* \* \* \* \*